Feb. 7, 1956 K. R. WHITCOMB 2,733,723
APPARATUS FOR REMOVING SEALANT FROM FUEL TANKS
Filed Jan. 29, 1951
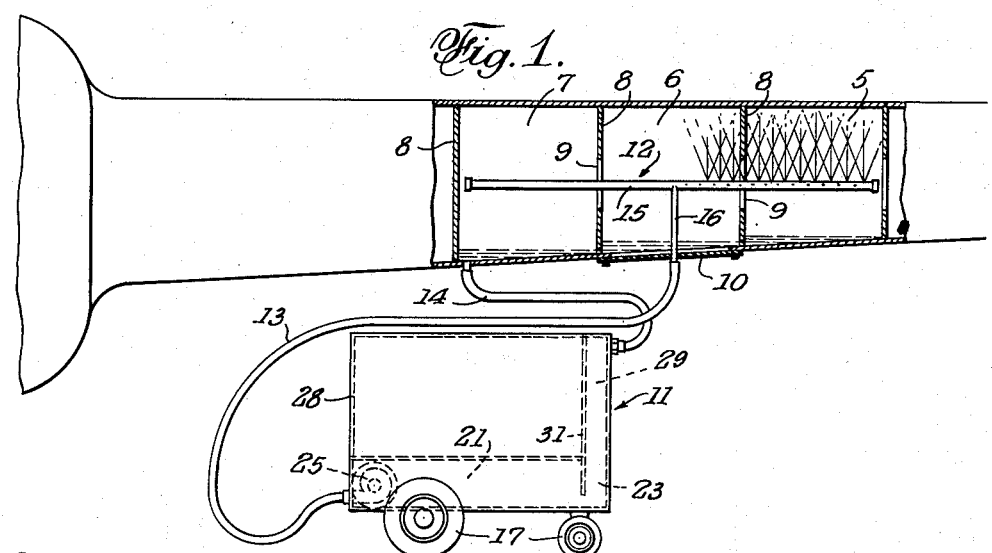
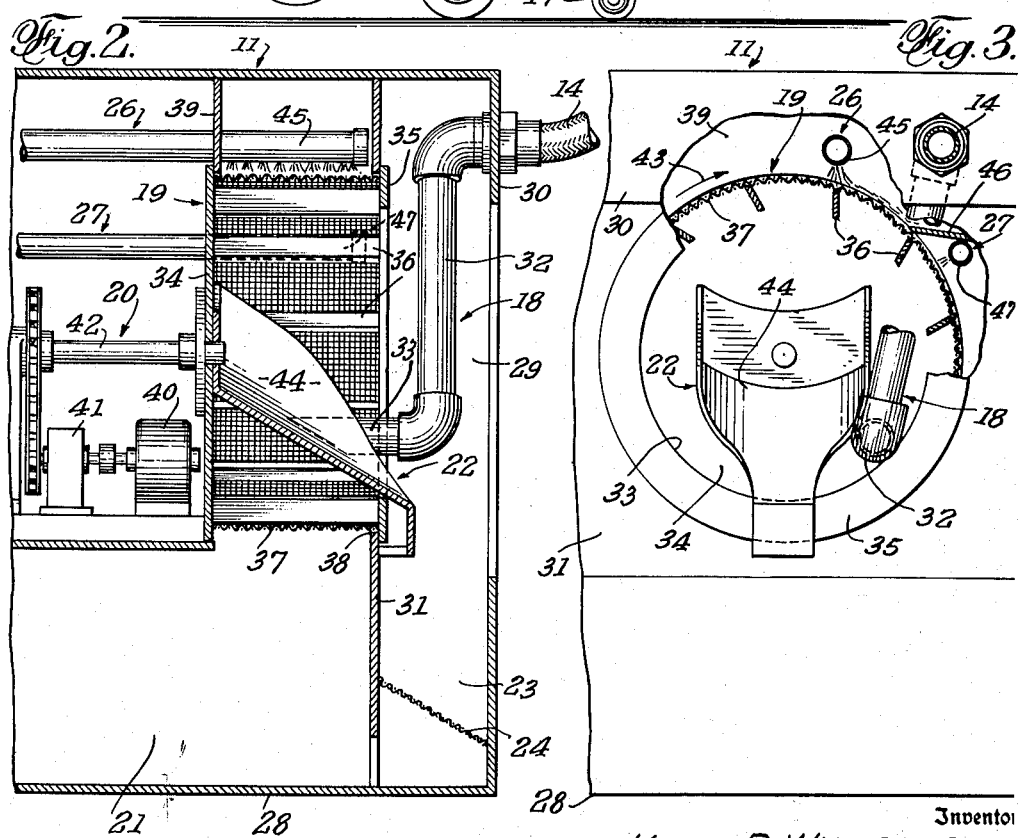
Inventor
KEITH R. WHITCOMB
By C. G. Stratton
Attorney

United States Patent Office 2,733,723
Patented Feb. 7, 1956

2,733,723

APPARATUS FOR REMOVING SEALANT FROM FUEL TANKS

Keith R. Whitcomb, Los Angeles, Calif., assignor to Cee-Bee Chemical Co., Inc., Los Angeles, Calif., a corporation of California Application January 29, 1951, Serial No. 208,299

3 Claims. (Cl. 134—111)

This invention relates to apparatus for removing the sealant that lines the interiors of integral fuel tanks, particularly of aircraft, is an improvement of the apparatus disclosed in U. S. Letters Patent No. 2,653,116, issued September 22, 1953, and pertaining in part, to the apparatus subject matter shown but not claimed in said issued patent.

Said patent discusses, in considerable detail, the disadvantages of prior spray-on and fill-and-drain methods employed to remove time-deteriorated sealants of which zinc chromate paste, accelerator-cured Thiokol, water dispersion Thiokol, and Buna N synthetic rubber are examples. Said method and the present apparatus employ a liquid solvent or stripper that is effective to soften and dissolve such sealants, the same varying according to the particular sealant being removed. Such solvents are highly volatile and are quite expensive. It is, therefore, desirable that as large a proportion of solvent used as is possible be recovered for further use to reduce the cost of sealant removal.

Accordingly, an object of the present invention is to provide apparatus for removing sealant from fuel tanks and to embody novel and efficient means for separating the removed sealant and the solvent used to effect such removal.

Another object of the invention is to provide improved means for effecting separation of sealant and solvent in a continuous manner so that the solvent may be re-circulated to the tank being stripped, thereby enabling sealant removal with a relatively small amount of solvent.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is an elevational view of apparatus according to the present invention and shown operatively connected to integral fuel tanks of an airplane to remove sealant from the walls of said tanks.

Fig. 2 is an enlarged fragmentary vertical sectional view of said apparatus.

Fig. 3 is a fragmentary front view thereof, partly broken away.

In Fig. 1 of the drawing, a portion of the wing of an airplane is shown in section to reveal that the same is divided into compartments 5, 6 and 7 by means of walls or bulkheads 8. One or more of said compartments may comprise an integral fuel tank. In this disclosure and in the appended claims, the term "integral tank" is intended to designate one of said compartments or two or more adjacent compartments that are in communication as by openings 9 in bulkheads 8. Access to each tank is afforded through a removable panel 10, the same usually being on the under surface of the wing substantially as shown. In practice, each integral tank is coated with a sealant so that the same will hold fuel without leakage.

The sealant removing apparatus that is illustrated comprises, generally, a portable unit 11 that embodies solvent storing and solvent and sealing separating means, a solvent spray head 12 disposed within an integral tank and connected by a flexible hose 13 to the discharge of unit 11, and a flexible hose 14 from the integral tank to convey stripped sealant together with solvent to unit 11.

The spray head 12 comprises an elongated, end-closed tube or pipe 15 that is provided with suitable perforations and, while not so shown, is advantageously made up of coupled sections of pipe to facilitate assembly of the spray head and introduction thereof into the fuel tank. A rigid T connection 16 is shown connecting pipe 15 and hose 13, the same passing through panel 10. The connection 16 may be articulated, if desired.

The portable unit 11 is mounted on wheels 17 for easy mobility and comprises a generally rectangular housing in which is enclosed the various components of the unit. Said components comprise, generally, an inlet 18 for stripped sealant, a rotating sealant and solvent separating drum 19 in the interior of which is received the discharge of inlet 18, a drive 20 for said drum, a tank 21 for receiving solvent passing through said drum, a fixed chute 22 within the drum for receiving stripped sealant from the interior of the drum and for directing the same outwardly thereof, a receptacle 23 for receiving said stripped sealant from the chute, a screen 24 at the bottom of receptacle 23 for catching stripped sealant falling from the chute and for permitting solvent to pass into tank 21, a pump 25 in tank 21 and connected to hose 13 to feed solvent from said tank to spray head 12, and spray means 26 and forced air means 27 for maintaining drum 19 in efficient solvent-passing condition.

The rectangular housing 28 of unit 11 is provided with a front compartment 29 that is defined by a front wall 30 and an intermediate wall 31. Inlet 18 comprises a pipe 32 that resides in compartment 29 and has a rearward extension 33 that terminates in the lower interior portion of drum 19. Receptacle 23 comprises the lower portion of compartment 29. It will be clear that material from the integral tank will be conducted by hose 14 to inlet 18 and deposited into drum 19.

The drum 19 comprises a circular back plate 34, a forwardly spaced flat ring 35, a set of vanes 36 that connect plate 34 and ring 35, and a screen 37 extending between said plate and ring and encircling the vanes to provide the drum with a perforate cylindrical wall. The drum is set in an opening 38 of wall 31 and in a similar opening in a rearwardly spaced wall 39.

The drive 20 comprises a motor 40, a speed reducer 41 driven by said motor, a shaft 42 fixed to the center of plate 34, and a chain drive connecting said shaft and speed reducer. The drive rotates the drum in the direction of arrow 43 and at a speed of about two revolutions per minute, this slow speed being for the purpose of avoiding centrifugal effects on the material in the interior of the drum. It will be evident that most of the solvent entering the drum will drain through screen 37 into tank 21 and that the stripped sealant will be carried by vanes 36 upwardly until, when near the top of the drum, the same will fall by gravity into chute 22.

Chute 22 is provided with a sloping bottom 44 and the lower end of said bottom discharges into receptacle 23 and the material discharged is intercepted by screen 24. Said material remains static in the receptacle and solvent therein will drain through said screen into tank 21. Accumulations in receptacle 23 are removed from time to time.

It will be realized that the stripped sealant will tend to line the inner side of screen 37 and reduce its ability to drain solvent. The spray means 26 is used to remove such clogging material and is shown as a perforated pipe 45 that directs a spray of liquid against the outside of the screen as the same rotates therepast. If the liquid used in pipe 45 is a solvent similar to that used for stripping the sealant, said pipe can be placed wherever desired and provision made to drain the spray liquid into tank 21. If water is to be used in pipe 45, it is necessary to collect the same separately since water and the solvent used tend to form an emulsion which cannot be used for sealant stripping purposes.

Accordingly, when water is used, pipe 45 is positioned beyond the top of the drum with respect to the direction of rotation of said drum. Fig. 3 shows this position and indicates also that the spray water, after impinging on screen 37, will drain only to the side in the direction of drum rotation where said water is intercepted by a wall 46 to a separate storage. Screen 37 has fine orifices, being approximately sixty mesh, and only a small portion of the spray of means 26 will pass through the screen, but the spray will be effective enough to loosen the sealant that clogs the orifices.

The loosened sealant material is then dislodged by the forced air means 27 which comprises a perforated pipe 47 that is similar to pipe 45.

It will be noted that vanes 36 are not radial but rather tangential to a circle generated around the center of rotation of the drum and are thereby disposed to present an edge to the spray of means 26 and minimize splashing of water that may pass through the screen orifices.

While the invention that has been illustrated and described is now regarded as the preferred embodiment, the construction is, of course, subject to modifications without departing from the spirit and scope of the invention. It is therefore not desired to restrict the invention to the particular form of construction illustrated and described, but to cover all modifications that may fall within the scope of the appended claims.

Having thus described the invention, what is claimed and desired to be secured by Letters Patent is:

1. Apparatus for removing sealant from the interior of an integral fuel tank for aircraft, comprising a receptacle outside of and spaced from the aircraft fuel tank for solvent capable, when impinging thereon, of removing said sealant from the tank, a spray head adapted to be disposed within the tank and to be arranged to impinge solvent upon sealant therein, a pump connected between the receptacle and the spray head for supplying solvent under pressure from the receptacle to the spray head, a drain connection adapted to be connected to the tank and discharging into the receptacle for solvent and removed sealant in a closed circuit, and rotatably mounted movable screen means between the drain connection and the pump, arranged to receive solvent and removed sealant from the drain connection and rotatable to carry the sealant thereon and to permit the free solvent to pass therethrough to the pump, rotation of the screen moving the sealant out of the path of the flow of subsequent solvent and discharging it by gravity.

2. Apparatus for removing sealant from the interior of a tank having a bottom drain, said apparatus comprising a sealant solvent-holding receptacle adapted to be disposed outside of the tank, a gravity flow connection adapted to extend from said tank drain to the receptacle, a spray head adapted to be disposed within the tank and arranged to discharge solvent in a direction to impinge upon the sealant in the tank, a pump, a flow connection between the outlet of the pump and the spray head, a flow connection between the receptacle and the inlet of the pump, all in closed circuit, screen means between the gravity flow connection and the pump to intercept removed sealant from the solvent, means to effect removal of removed sealant from the screen simultaneously with gravity drain from the tank to the receptacle, the screen means comprising a revolving cylindrical screen disposed on a substantially horizontal axis, the mentioned gravity flow connection being disposed to discharge solvent and removed sealant to the interior of said cylindrical screen, a fixed sloping chute disposed within the screen and adapted to receive sealant falling by gravity from the screen as the same revolves.

3. Apparatus for removing sealant from the interior of an integral fuel tank for aircraft, comprising a receptacle outside of and spaced from the aircraft fuel tank for solvent capable, when impinging thereon, of removing said sealant from the tank, a spray head adapted to be disposed within the tank and to be arranged to impinge solvent upon sealant therein, a pump connected between the receptacle and the spray head for supplying solvent under pressure from the receptacle to the spray head, a drain connection adapted to be connected to the tank and discharging into the receptacle for solvent and removed sealant in a closed circuit, and movably mounted screen means in the circuit between the drain connection and the pump, arranged to receive solvent and removed sealant from the drain connection and to carry the sealant thereon and to permit the free solvent to pass therethrough to the pump, the screen means being movable to a point of discharge removed from the path of the flow of subsequent solvent and removed sealant, and means at said point of discharge to receive removed sealant from the screen.

References Cited in the file of this patent

UNITED STATES PATENTS

| Re. 19,374 | Butterworth | Nov. 20, 1934 |
| 1,279,949 | Waterman | Sept. 24, 1918 |
| 1,528,069 | Merseles | Mar. 3, 1925 |
| 1,628,141 | Gray | May 10, 1927 |
| 1,633,396 | Clarin | June 21, 1927 |
| 1,712,258 | Compain | May 7, 1929 |
| 1,899,019 | Deutsch | Feb. 28, 1933 |
| 2,064,403 | Barker | Dec. 15, 1936 |
| 2,222,516 | Powell | Nov. 19, 1940 |
| 2,257,686 | Hock | Sept. 30, 1941 |
| 2,627,863 | Covicchioli | Feb. 10, 1953 |
| 2,629,390 | Walker | Feb. 24, 1953 |
| 2,649,765 | Anderson | Aug. 25, 1953 |
| 2,653,116 | Whitcomb et al. | Sept. 22, 1953 |

FOREIGN PATENTS

| 1,615 | Great Britain | of 1898 |
| 208,928 | Great Britain | Jan. 3, 1924 |